Aug. 1, 1939.　　　　F. T. O'GRADY　　　　2,168,043
MOTION PICTURE FILM-ADVANCING MECHANISM
Filed Nov. 10, 1937
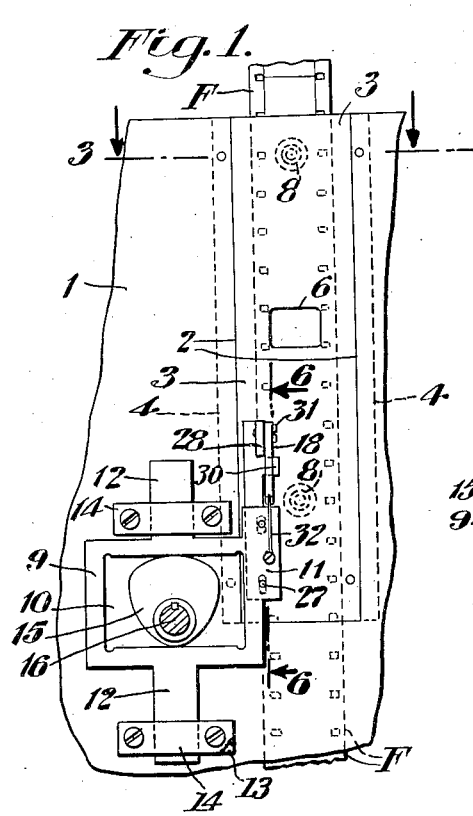
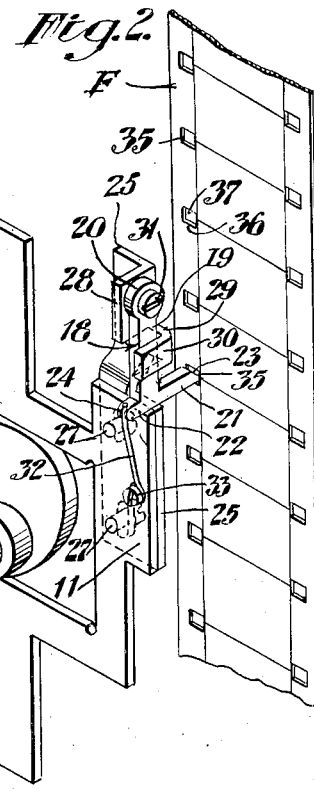
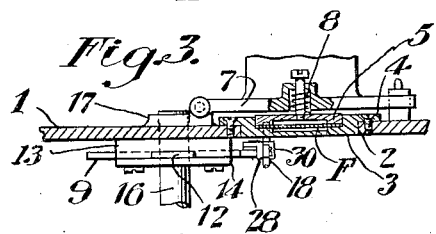
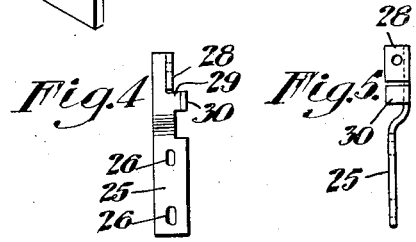
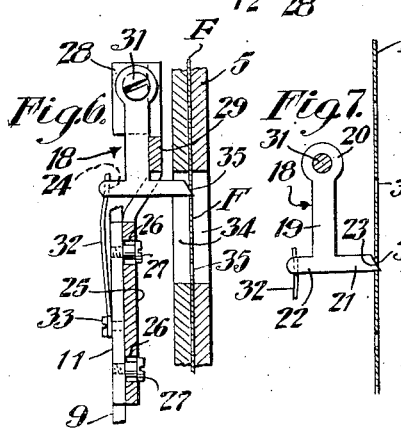
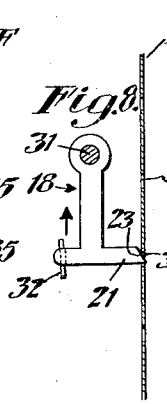
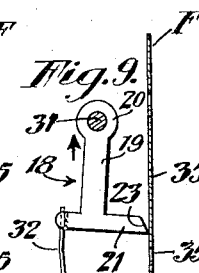
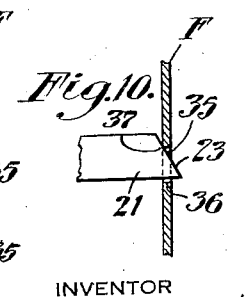
INVENTOR
Frederick T. O'Grady
BY
ATTORNEYS Patented Aug. 1, 1939

2,168,043

UNITED STATES PATENT OFFICE 2,168,043

MOTION PICTURE FILM-ADVANCING MECHANISM

Frederick T. O'Grady, Flushing, N. Y.

Application November 10, 1937, Serial No. 173,736

3 Claims. (Cl. 88—18.4)

This invention relates to improvements in film-advancing mechanisms such as are employed in motion picture cameras, film-printing machines and projection machines to advance a motion picture film intermittently across an exposure aperture. More particularly the invention relates to improvements in film-advancing mechanisms of the type wherein a film-advancing element known as a "claw" is projected into a socket hole, shifted to advance the film and then retracted from the sprocket hole, shifted back along the film and projected into a following sprocket hole to repeat the film-advancing operation.

Important objects of the invention are to provide a generally improved film-advancing mechanism of the said claw type; to provide such a mechanism designed to eliminate the usual wear upon the film consequent to the projection of the claw into the sprocket holes and its withdrawal from the holes; to facilitate threading of a motion picture film into operative relation to the film advancing mechanism without damage to the film; and to provide such a mechanism of materially simplified construction.

Other objects of the invention will appear hereinafter.

In the drawing,

Fig. 1 is a rear elevation of the improved film-advancing mechanism operatively mounted for use in a motion picture projection machine;

Fig. 2 is a perspective view showing the film-advancing mechanism operatively associated with a motion picture film;

Fig. 3 is a horizontal section taken on the line 3—3 of Fig. 1;

Fig. 4 is a face view of the supporting bracket for the film-advancing claw;

Fig. 5 is a side edge view of the claw-supporting bracket;

Fig. 6 is an enlarged section on the line 6—6 of Fig. 1;

Figs. 7, 8 and 9 are detail views of the claw member in elevation and a motion picture film in longitudinal section and illustrating the co-operation of the film and claw member; and Fig. 10 is an enlarged detail view showing more clearly the relation of the claw to the film when the claw is in the position shown in Fig. 8.

In a standard film-advancing mechanism of the claw type the claw element is in the form of a pin. For operating the claw pin there is employed a cam movement to reciprocate the pin on its film-advancing and return strokes and another cam movement to project the pin endwise into the successive sprocket holes of the film and also retract it from the holes. This form of claw element and the manner in which it is operated frequently cause damage to the film, at the sprocket holes. On each film-advancing stroke the pin, by its engagement with the forward edge of the sprocket hole, is subjected to a wear or cutting action which eventually forms a dent or notch in the forward side of the pin. At the conclusion of said stroke the notched pin is positively yanked from the hole by the cam movement with consequent tearing strain upon the forward edge of the sprocket hole. The pin may also strike and tear the margin of a sprocket hole when it is projected by the cam movement to enter the hole. Tearing of the film by the pin is particularly likely to occur when the film is not accurately threaded into the film-advancing mechanism.

The said damage to a motion picture film shortens its life and also impairs the steadiness and clearness of motion pictures projected therefrom upon a viewing screen. In the operations of photographing upon a film, printing the picture upon a positive film and projecting the printed pictures, it is necessary, in order to obtain accuracy in the ultimate projection, that the films employed in each of said operations should register accurately with an exposure aperture. This accurate registration cannot be obtained if any one of the films is damaged at the sprocket holes. My invention is directed primarily to the provision of a film-advancing mechanism designed to prevent such damage and also to simplify the structure of the mechanism.

In the drawing I designates a front wall portion of a projection machine. Said wall has a vertical slot 2 in which there is fitted a projection aperture plate 3. Side flanges 4 borne by said plate abut the forward face of said wall and are detachably secured thereto. A film presser plate 5 is opposed to the front face of plate 3 and said plates have registering projection apertures 6 corresponding in size and shape to the film pictures to be projected. There is shown a 16 mm. film F. Such a film has sprocket holes or perforations only at the dividing lines between successive picture spaces or "frames." The film is guided between the opposed plates 3 and 5, and the forward face of plate 3 is vertically channeled to receive the film and engage its side edges to hold it against lateral displacement. Plate 5 also fits in the channel. Both plates are medially grooved out at their opposed surfaces so that they will engage only the side margins of the film, outside of the picture areas or frames. Forward of the plate 5 there is the usual film gate plate 7, hinged to the wall 1 and bearing, in alinement with the projection apertures 6, projection lens means, not shown. Springs 8 borne by the gate plate 5 bear against the presser plate 5 and constantly urge it toward plate 3. Thereby the interposed film is flattened at the exposure apertures and frictionally held against accidental displacement longitudinally. The film so held is operated upon by the claw feed means to advance the film step-by-step to expose the pictures in succession in register with the apertures 6 for projection by light from a source, not shown.

A shuttle 9 is mounted upon the rear face of the wall 1 to reciprocate vertically. Said shuttle in the present instance comprises a flat metal plate having a substantially rectangular central aperture 10. The upper and lower edges of said aperture are parallel and horizontal. At one of its upper corners the shuttle plate has an integral tongue-like extension 11 upon which the film-advancing claw member is mounted, as will be described hereinafter. At its upper and lower edges the shuttle plate has integral guide shanks 12 extending vertically in opposite directions. Upon its rear face the wall 1 bears guide ribs 13 grooved to slidably receive the shanks 12, and plates 14 are detachably secured to said ribs to confine the shanks in the guide grooves. Thereby the shuttle is mounted for vertical reciprocation.

The shuttle is reciprocated by a rotary cam 15 disposed within the aperture 10 of the shuttle to engage the parallel upper and lower edges of said aperture. The cam is mounted upon a shaft 16 and keyed to rotate with it. A bearing 17 borne by the wall 1 forms part of the shaft support, and the shaft is driven from a power source, not shown.

The film-advancing claw member, designated 18, is of pawl-like shape. It comprises a straight narrow body portion 19 formed with a pivot eye 20 at one end, and extensions 21 and 22 at its opposite end and projecting in opposite directions, at right angles to said body portion. The extension 21 is longer than extension 22 and is beveled at its outer end to provide it with an inclined cam surface 23. A notch 24 is formed in the outer end of the extension 22. The purposes of said cam surface and notch will be explained hereinafter.

As previously mentioned the claw member 18 is mounted upon the extension 11 of the shuttle plate. Its mounting includes a bracket 25 formed from a metal strip. A pair of vertically spaced slots 26 are formed in said bracket, and headed screws 27 have their shanks passed through said slots and screwed into threaded holes in the shuttle extension 11. Thereby the bracket is mounted upon the shuttle for vertical adjustment. The bracket extends above the shuttle extension 11 and is bent to forwardly offset its upper portion. Said upper portion is formed with an ear 28 bent rearward from a side edge thereof and provided with a pivot hole. A stop lug 29 integrally formed upon the bracket extends laterally therefrom at a point immediately below said ear and has a rearwardly bent portion 30 laterally offset from the ear. The claw member 18 has its pivot eye 20 disposed at the outer face of the bracket ear 28 and connected to the ear by a pivot 31 so that the claw depends from its pivot and can swing fore-and-aft. As shown, the axis of the pivot is spaced rearward from the plane of the adjacent face of the supported film a distance materially less than the length of the shuttle stroke, and the lower edge of the claw is spaced from the pivot axis a distance materially exceeding the length of the shuttle stroke. Thereby the point of the claw is enabled to swing into and out of the sprocket holes on an arc of only slight curvature, to avoid snagging on the edges of the holes. The claw member is disposed inward of the rearwardly turned portion 30 of the stop lug 29 so that said lug will limit the forward swing of the claw, and the portion 30 of the lug will guide the swinging of the claw member. The ear 28 is of material depth, and the ear and the lug portion 30 form positive guides to engage the opposite sides of the claw member at points spaced materially from the pivot axis and prevent the claw member from wobbling laterally. That prevents engagement of the claw with the side edges of the sprocket holes and also contributes to accurate film advance by preventing foreshortening of the claw member along the direction of advance. A light spring 32 of the leaf type constantly urges the claw member forward toward the stop lug. As shown, said spring may be made of a length of wire looped at its lower end and secured to the shuttle by a headed screw 33. The upper end of the spring engages in the notch 24 of the claw member.

The beveled extension 21 of the claw member constitutes the actual claw portion of said member. It is normally held forwardly projected by the spring 32, and the film guiding plates 3 and 5 have registering vertical slots 34, as shown in Fig. 6, affording clearance for entry of the claw into one of the sprocket holes 35 of the film F. The claw 21 and the slots 35 are located below the exposure apertures 6 and in line with the row of sprocket holes along one margin of the film, and the length of the slots is sufficient to permit full reciprocation of the shuttle without contact of the claw with the ends of the slots. In a 16 mm. film the distance between the centers of adjacent sprocket holes in a row, or the distance between corresponding points on adjacent pictures, is .300". In the usual film-advancing mechanism of the claw type the claw is reciprocated just that distance. The cam 15 of the present mechanism is designed so that its throw is slightly greater, say approximately .320, and the shuttle and claw will be reciprocated through that distance. The claw thus has a travel exceeding the distance between corresponding points on adjacent film picture spaces by a fraction of the width of the sprocket hole, measured longitudinally of the film. The purpose of this slight increase in the claw stroke will be explained hereinafter. The beveled claw 21 is designed so that it can enter a film sprocket hole sufficiently, and as far as permitted by the stop 29, without contact with any of the edges of the hole.

Before operation of the film-advancing mechanism the supporting bracket 25 for the claw member is adjusted vertically upon shuttle 9, as permitted by the slots 26 and screws 27, and with reference to the projection apertures 6, in order to position the claw 21 so that it will pull the successive film pictures into accurate register with the apertures 6. The film F is threaded into place between the plates 3 and 5, and the contact of the film with the beveled end of the claw forces the claw rearward out of the way against the resistance of the light spring 32. This avoids possible damage to the film by the claw.

Rotation of the power-driven shaft 16 rotates the cam 15 and reciprocates the shuttle and claw. The under side of the claw 21 is normally on a straight, horizontal fore-and-aft line, and, at the beginning of a downward stroke the claw is moved to take up the clearance between said edge and the forward edge 36 of the sprocket hole penetrated by the claw, as shown in Fig. 7. After engagement of the claw with edge 36 the film is advanced or pulled down to the proper degree by the movement of the claw on the remainder of its working stroke. When the claw is in engagement with edge 36 its cam edge 23 is spaced out of contact with the rear edge 37 of the sprocket hole owing to the fact that the maximum vertical dimension of the portion of the claw within the sprocket hole is less than the vertical width of the hole. At the beginning of the idle, return stroke of the claw the under edge of the latter is first elevated from the lower edge 36 of the sprocket hole, as shown in Figs. 8 and 10. Then the cam edge 23 is brought into contact with the upper edge 37 of the hole. The cam edge slopes upwardly and rearwardly so that as the return stroke continues the claw is cammed out of the sprocket hole by its engagement with edge 37 and against the light resistance of spring 32. The film is held stationary for this camming effect by its compression between the plates 3 and 5.

It will be observed that there is no retraction of the claw from the sprocket hole by said camming effect until after the lower edge of the claw has moved away from the lower edge of the sprocket hole. This eliminates the danger of snagging the edge 37 as the claw is retracted. As the return stroke continues the retracted claw wipes along the rear marginal face of the film, as shown in Fig. 9, until it passes the lower edge 36 of the next succeeding sprocket hole, whereupon the light spring 32 will project the claw into said hole. Owing to the aforesaid slight increase in stroke length, the claw, at the upper end of its stroke will be in a position free of the edge 36 of the sprocket hole.

It will be seen that the improved film-advancing mechanism is designed to prevent damage to the film by the claw. It will be seen also that the provision for retracting the claw by camming coaction of the claw and the film materially simplifies the structure of the mechanism.

While the improved mechanism is disclosed as adapted for advance of a 16 mm. film it is capable of satisfactory employment with a 35 mm. film having a greater number of sprocket holes per picture space. In that case the bevelled claw will readily ratchet over the intervening sprocket holes. Also, while the mechanism is shown and described in connection with motion picture projection it is capable of very satisfactory employment in other connections where intermittent film advance is required, as in photographing and printing, for examples. Therefore I do not wish to be limited strictly to this disclosure but reserve the right to make such structural changes and adaptations as will lie within the scope of the appended claims.

What I claim is:

1. Motion picture film-advancing mechanism including means to support and guide a film for longitudinal advance, a shuttle mounted to reciprocate along the direction of film advance, a film-advancing pawl pivotally borne by said shuttle and having a claw end to enter successive sprocket holes of the film for advance of the film on the forward strokes of the shuttle and to ratchet out of the holes on the return strokes of the shuttle, and means yieldingly urging said claw toward the film, characterized in that there is means to reciprocate the shuttle and claw on a stroke exceeding the distance between corresponding points on successive film picture spaces by a fraction of the sprocket hole dimension longitudinally of the film, the film-advancing edge of the claw is spaced in advance of the pivot axis of the pawl a distance materially exceeding the stroke of the shuttle, the pivot axis is spaced from the plane of the adjacent face of the supported film a distance materially less than the shuttle stroke, there is stop means to positively limit projection of the claw into the sprocket holes, the portion of the claw projectible into the sprocket holes is of a size to afford clearance for appreciable shift of the claw between the fore and aft edges of the holes and is formed and arranged for camming over the rear edges of the holes to withdraw it from the holes without engaging the forward edges of the holes, and there are positive guides borne by the shuttle to engage opposite sides of the pawl at points materially spaced from its pivot to prevent lateral wobble of the pawl.

2. Motion picture film-advancing mechanism including means to support and guide a film for longitudinal advance, a shuttle mounted to reciprocate along the direction of film advance, a film-advancing pawl pivotally borne by said shuttle and having a claw end to enter successive sprocket holes of the film for advance of the film on the forward strokes of the shuttle and to ratchet out of the holes on the return strokes of the shuttle, and means yieldingly urging said claw toward the film, characterized in that there is means to reciprocate the shuttle and claw on a stroke exceeding the distance between corresponding points on successive film picture spaces by a fraction of the sprocket hole dimension longitudinally of the film, there is stop means to positively limit projection of the claw into the sprocket holes, the portion of the claw projectible into the sprocket holes is of a size to afford clearance for appreciable shift of the claw between the fore and aft edges of the holes and is formed and arranged for camming over the rear edges of the holes to withdraw it from the holes without engaging the forward edges of the holes, and there are positive guides borne by the shuttle to engage opposite sides of the pawl at points materially spaced from its pivot to prevent lateral wobble of the pawl.

3. Film-advancing mechanism according to claim 2, characterized in that there is a bracket borne by the shuttle, said bracket bears the pawl pivot, the pawl, the said stop means to limit projection of the claw and the said guide means to prevent wobble of the pawl, and said bracket is mounted for adjustment on the shuttle longitudinally of the stroke of the shuttle.

FREDERICK T. O'GRADY.